(12) United States Patent
Wilson et al.

(10) Patent No.: US 10,219,597 B2
(45) Date of Patent: Mar. 5, 2019

(54) ONE-PIECE PROTECTIVE CARRYING CASE

(71) Applicant: Uncommon LLC, Chicago, IL (US)

(72) Inventors: Scott Wilson, Chicago, IL (US); Dustin Brown, Chicago, IL (US); Jon Godston, Chicago, IL (US); William Welch, Los Altos, CA (US); John Hong, Chicago, IL (US)

(73) Assignee: Uncommon LLC, Chicago, IL (US)

( * ) Notice: Subject to any disclaimer, the term of this patent is extended or adjusted under 35 U.S.C. 154(b) by 0 days.

(21) Appl. No.: 15/422,860

(22) Filed: Feb. 2, 2017

(65) Prior Publication Data

US 2017/0366216 A1    Dec. 21, 2017

Related U.S. Application Data

(63) Continuation of application No. 13/413,606, filed on Mar. 6, 2012, now abandoned, which is a continuation of application No. 12/855,311, filed on Aug. 12, 2010, now Pat. No. 8,286,789.

(60) Provisional application No. 61/233,146, filed on Aug. 12, 2009.

(51) Int. Cl.
*B65D 85/30* (2006.01)
*A45C 11/00* (2006.01)
*H04B 1/3888* (2015.01)
*A45C 13/08* (2006.01)

(52) U.S. Cl.
CPC ............ *A45C 11/00* (2013.01); *H04B 1/3888* (2013.01); *A45C 13/08* (2013.01); *A45C 2011/002* (2013.01); *Y10T 29/49895* (2015.01)

(58) Field of Classification Search
CPC .. A45C 2011/002–2011/003; A45C 2013/025; A45F 5/00
USPC ......................................................... 206/320
See application file for complete search history.

(56) References Cited

U.S. PATENT DOCUMENTS

| | | | | |
|---|---|---|---|---|
| 4,238,033 A * | 12/1980 | Artzt | ......................... | A61J 7/04 206/534 |
| 7,930,011 B2 * | 4/2011 | Shi | ......................... | H05K 5/0243 206/320 |
| 7,933,122 B2 * | 4/2011 | Richardson | .......... | H05K 5/0017 206/320 |
| 8,167,127 B2 * | 5/2012 | Martin | ................... | G11B 31/00 206/320 |
| 2008/0308437 A1 * | 12/2008 | Lin | ....................... | G06F 1/1616 206/320 |
| 2009/0230161 A1 * | 9/2009 | Emsky | ................... | A45C 11/00 224/257 |
| 2010/0096284 A1 * | 4/2010 | Bau | ....................... | H04B 1/3888 206/320 |

(Continued)

*Primary Examiner* — Luan K Bui
(74) *Attorney, Agent, or Firm* — Bishop, Diehl & Lee, Ltd.

(57) ABSTRACT

A carrying case for a portable electronic device is disclosed. Generally speaking, the protective case for a portable electronic device comprises a body section having a back surface and upturned sides, and a rim affixed to an edge of the upturned sides of the body sections, the rim defining an open area. Preferably, the body section is comprised of contrasting colors and forms a cavity defined by the back surface and the upturned sides. Further, the body section and the rim are preferably formed of the same material. A second protective section may be used to form a protective shell-like structure about the electronic device.

17 Claims, 10 Drawing Sheets

(56) References Cited

U.S. PATENT DOCUMENTS

| | | | | |
|---|---|---|---|---|
| 2011/0259664 A1* | 10/2011 | Freeman | ............... | A45C 11/00 181/202 |
| 2011/0259771 A1* | 10/2011 | Johnson | ............... | A45C 11/00 206/320 |
| 2012/0031788 A1* | 2/2012 | Mongan | ............... | A45C 11/00 206/320 |

* cited by examiner

ONE-PIECE PROTECTIVE CARRYING CASE

RELATED APPLICATIONS

The present application is a continuation of, and incorporates herein by reference, U.S. application Ser. No. 13/413,606, filed on Mar. 6, 2012, which is a continuation-in-part of U.S. application Ser. No. 12/855,311, filed on Aug. 12, 2010, which claims priority to U.S. Provisional Application No. 61/233,146, filed Aug. 12, 2009.

TECHNICAL FIELD

The present invention relates to protective cases for electronic devices, and more specifically to thermoformed protective cases formed by a two-piece resin technique to ensure high quality registration of features on one or both sides of the item.

BACKGROUND OF THE INVENTION

Previously, to produce thermoformed items having details disposed on one or both sides of the item, using a plastic or other suitable material, required the use of different and multiple molding processes. For example, a sheet of material or fluid material from which an item was to be formed might be initially positioned within or directed into an injection or compression molding device in order to create detail or features required on at least one side of the item. Subsequently, the material sheet would then be positioned or run through a suitable second thermoforming device to complete the formation of the item from the material. The resulting thermoformed item might then be heat-treated under vacuum conditions with a dye printing sheet to print a pre-drawn design onto a surface of the item.

However, these multi-step processes have a number of significant drawbacks. First, the added steps typically slow production time and increase production cost. Second, subjecting the item to repeated high-temperature steps can have a detrimental effect on the item.

As to the first point, to initially print the detailed design on the thermoformed item, the process may require both a detail molding device and step, which can be either an injection molding step or a compression molding step, as well as a final thermoforming step (e.g., melting or sublimation techniques) used to create the final form for the item. Finally, the pre-drawn design needs to be imprinted to the item. The multiple steps and molding devices required for each step significantly increases the complexity of the process and the costs for producing the final item with an image or design printed thereon.

Of no less importance is the integrity of the final item. That is, when a sheet of material is positioned within the heat treatment device to finalize the transfer of the dye printing onto the item, often times the process results in a partial or complete deformation or destruction of the original detail from the initial thermoforming steps. That is, due to the repeated use of high-temperatures necessary to initiate transfer of the dye from a pre-printed film to one or both sides of the thermoformed item, the edges around the item may be unable to withstand such heat for the required duration of the transfer process. However, shortened heat transfer times would fail to ensure consistent transfer of the dye on the entire surface of the item. Thus, the resulting item may often be undesirable or unusable for its intended purpose due to the damage done to the thermoform details on the item.

Therefore, it is desirable to develop a device and method for thermoforming an item which is capable of effectively transferring the image from the printing sheet to a surface of the item in a single step utilizing only the thermoforming device.

SUMMARY OF THE INVENTION

There is disclosed herein an improved protective carry case for a device, such as a portable electronic device (e.g., computer, tablet, phone, camera, PDA, etc.) which avoids the disadvantages of prior devices while affording additional structural and operating advantages.

Generally speaking, the protective case for a portable electronic device comprises a molded body section having a back surface and upturned sides extending from the back surface, and also having a design printed thereon, and a distinctly molded rim tightly bonded or otherwise affixed to an edge of at least one of either the back surface and the upturned sides of the body section. The rim masks molding and printing imperfections when bonded to the body section and forms a periphery of a cavity configured to house an electronic device.

In an embodiment of the protective case, the body section and the rim are formed of the same material. Further, at least one opening is positioned on an upturned side of the body section. Such opening may be completely or partially enclosed within the body and allows access to control buttons or switches for the electronic device.

In another embodiment, a second molded body section, separate and distinct from the first body section, may be used and configured to conceal another surface of the protected electronic device other than that covered by the first body section. The molded body section and the second molded body section may have contrasting colors.

In an embodiment of the present invention, a protective case for a portable electronic device comprises a first molded body section having a back surface and upturned sides extending from the back surface, a separately molded rim bonded to an edge of at least one of either the back surface and the upturned sides of the first body section, the rim defining an open area, and a second molded body section having a back surface and upturned sides extending from the back surface, wherein the first and second body sections cooperate to form a cavity, and the first and second body sections and the rim are all formed of the same material. In this embodiment, the rim masks molding and printing imperfections when bonded to the first body section and forms a periphery of a cavity configured to house an electronic device.

In the event a camera or other sound or image recording device is provided by the portable device, it is an aspect of an embodiment of the invention to provide a passage having an opening on each of the back surface and the inner surface of one of either the first body section or the second body section, the openings being connected by a sidewall. The sidewall is preferably slanted outward to lessen possible interference with the image and/or sound recording function.

These and other aspects of the invention can be more readily understood from a reading of the following detailed description accompanied by the appended drawing figures.

BRIEF DESCRIPTION OF THE DRAWINGS

The invention may be better understood with reference to the following drawings. The components in the drawings are not necessarily to scale, emphasis instead being placed upon illustrating the principles of the invention. In the drawings, like reference numbers designate corresponding parts throughout.

DETAILED DESCRIPTION OF THE INVENTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

Referring to FIGS. 1-8, there is illustrated an embodiment of a protective carrying case, generally designated by the number 10, for a portable electronic device. Distinct embodiments are referenced using a prefix number, such as "1, 2, 3, etc." before the general designation number. For example, protective case 110 refers to a second distinct embodiment of case 10.

General reference numbers and their corresponding prefixed numbers, as used within FIGS. 1-8 and in the detailed description to follow, correspond as shown to the following elements:

| Reference Number | Element |
| --- | --- |
| 10 | protective carrying case; |
| 12 | (first) body section; |
| 114 | second body section; |
| 16 | rim; |
| 17 | open area; |
| 18 | back surface; |
| 22 | cavity; |
| 24 | inner surface; |
| 25 | edge; |
| 26 | upturned side; |
| 28a/28b | button openings; |
| 32 | conical passage; |
| 34 | passage sidewall; |
| 36 | opening, inner surface; and |
| 38 | opening, back surface. |

The two illustrated and described embodiments relate to either a protective case 10 for a tablet computer (not shown) or a protective case 110 for a notebook computer (not shown). However, a carrying case 10 made in accordance with the present disclosure may be equally applicable to other electronic devices, such as digital readers, game consoles, and the like.

The specific illustrated embodiment of FIGS. 1-6 is representative of a carrying case 10 designed for an iPad, manufactured and sold by Apple, Inc. The case 10 may be reconfigured and resized to fit any number of portable electronic devices, including smart phones, PDA devices, calculators, cameras, global positioning system (GPS) devices, and the like. Those skilled in the relevant art will be able to understand and provide the required design changes to accommodate such alternate devices after a reading of the present detailed disclosure, including the appended drawing figures, without need for undue experimentation.

As shown, the protective case 10 includes a body section 12 and a rim 16. Preferably, the two components are formed of high-strength thermoplastic polymers such as ABS and polycarbonate materials known in the art. The body sections 12 has a back surface 18 which transforms along an edge 25 into upturned sides 26. The edge 25 is preferably radiused to provide a smooth transition from back surface 18 to sides 26. However, the edge 25 may be in the form of a traditional 45 degree corner, or some variation, as well. A cavity 22 is formed as defined by an inner surface 24 of the body section 12 and the upturned sides 26.

The body section 12 also includes at least one integral button opening 28 for aligning with control switches on the encased electronic device (not shown), such as for volume and on/off buttons. There openings 28 are preferably positioned within the upturned side 26 of the body section 12, but also on the back surface 18. In the illustrated embodiment, an opening 28a is positioned on a left or right side of the body section 12 and another opening 28b is positioned on the back surface 18 of the body section 12. Additional openings may be used to suit the various configurations of other electronic devices.

Figure 1:
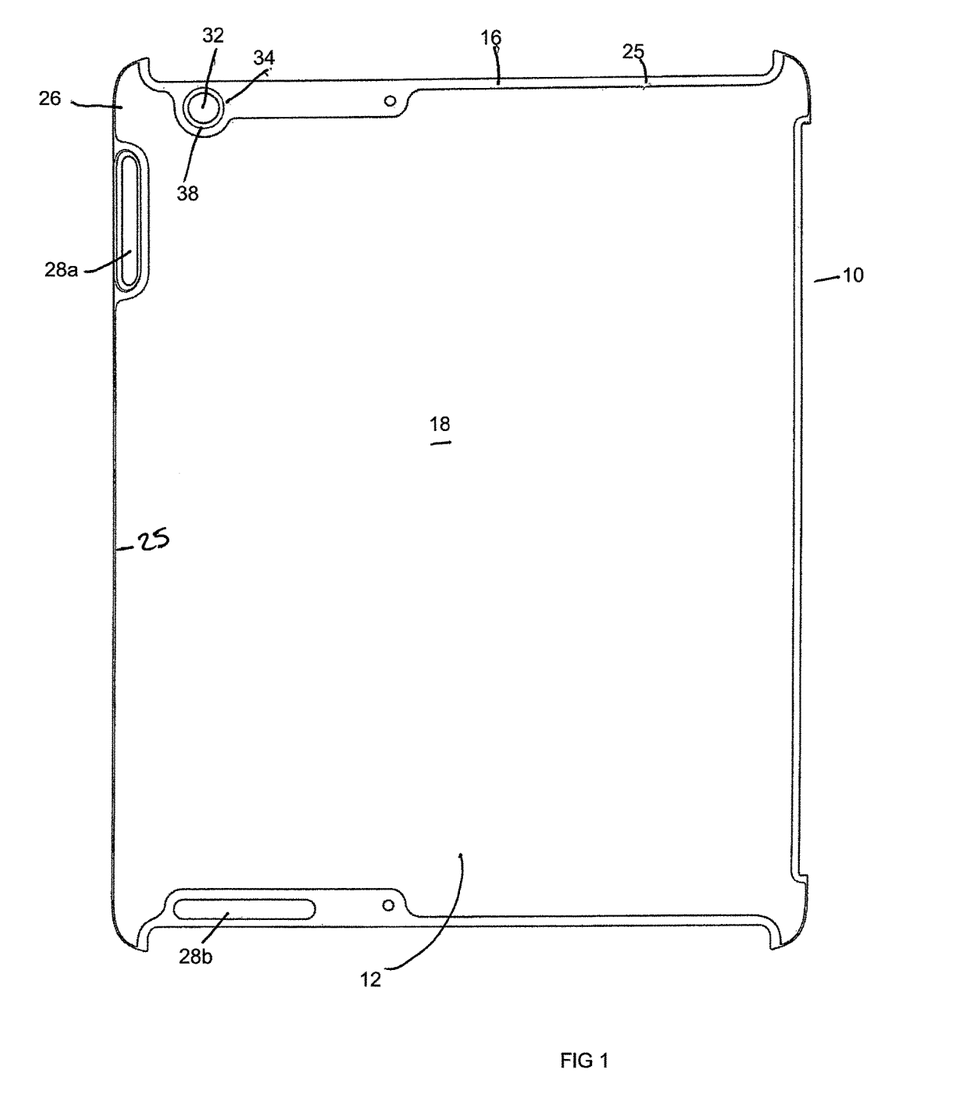
FIG. 1 is a perspective view of an embodiment of a the protective case in accordance with the present invention.
Figure 2:
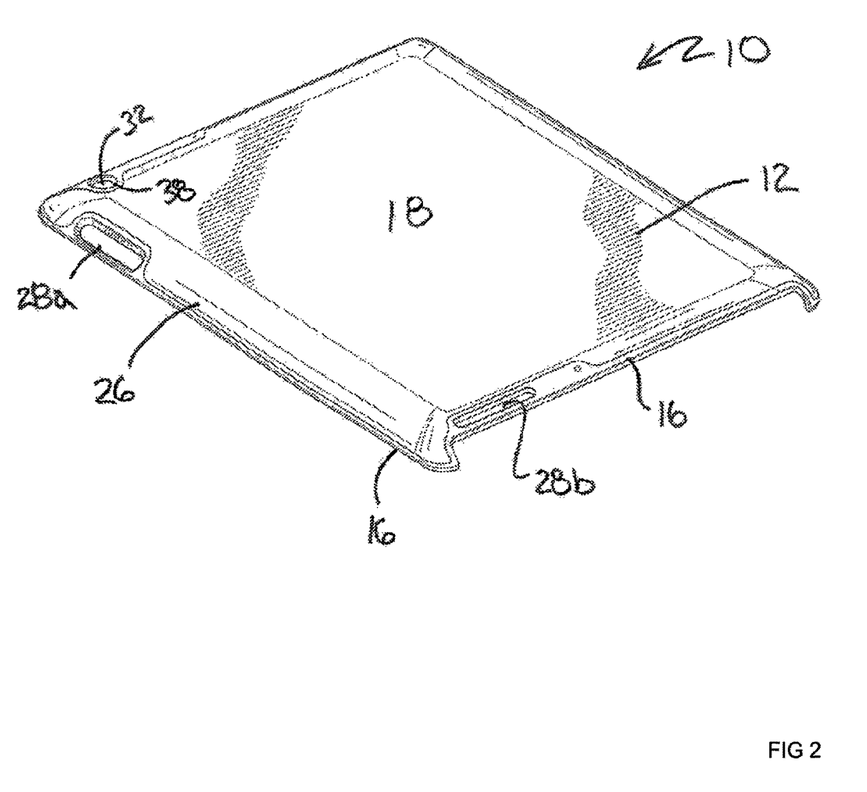
FIG. 2 is a perspective view of an embodiment of the protective case.

As shown best in FIGS. 1 and 2, a rim 16 is affixed to an edge of the upturned side 26 of the body section 12 as well as a portion of the back surface 18. The rim 16 provides a slight overhang to the cavity 22 to facilitate securing an electronic device within the protective case 10. The rim 16 frames an open area 17 where typically display and/or keyboard functions are located.

The inner surface 24 of the case 10 may include a plurality of stops (not shown) for frictionally engaging an outer surface of an electronic device. If used, the stops would be preferably comprised of a high-friction material, such as a rubber or other suitable polymer. For ease of placement, the preferred stops are substantially clear, dome-shaped decals which adhere to the inner surface 24 by any suitable adhesive.

Another contemplated use for the inner surface 24 of the body section 12 is as advertising space. For example, corporate logos, brand names and the like may be incorporated into the mold tooling.

Further, it is also contemplated that the body section 12 and rim 16 may be provided with contrasting colors to mask overprinting. Preferably, the body section 12 is provided in white (or other light color) and the rim 16 is provided in black (or other significantly dark color). If ink is printed, for example, over the white section and overprints to the black section, the ink will not show on the black. The effect will be a clean line at the junction of the two colors. It will be understood that any contrasting color can be applied to the first body section 12 and rim 16 to accomplish the intended goal of the present invention.

As mentioned above, it has been determined that many materials, particularly plastics, are unable to withstand repeated high temperatures (e.g., 160° C. and up) for the required duration of a heat-transfer process. For example, during a thermo-transfer process wherein the dye from the pre-printed film is introduced to the body section 12, the dye may not be consistently transferred onto the entire second body section 12. In fact, it is not uncommon for the edge 25 of the body section 12 to be susceptible to deformation at high temperatures. As a result, the quality of the transferred dye on the body section 12 of the case 10 may be functionally or aesthetically undesirable and even come off.

However, the separately molded rim 16 is tightly bonded to body section 12, which accomplishes at least a few goals of embodiments of the present invention. First, the rim 16 creates a perfect line about the open area 17 much like the contrasting colors of the two components, as described above. Second, the rim 16 is also able to mask many physical imperfections in the edge 25 as a result of the ink heat transfer (e.g., sublimation process). The rim 16 may also provide structural support to the case in many instances.

Therefore, it is preferably contemplated that the separately molded rim 16 be affixed to the body section 12 and integrally bonded in either an injection molding or compression molding process. This subsequent bonding of the rim along an edge 25 of the upturned sides 26 of the body section 12 ensures that any loosely transferred dye along this area of the body section 12 is masked by the rim 16.

Additionally, indicia may be printed on the back surface 18 of the case 10 or on the inner surface 24 of the body section 12 to indicate proper orientation.

Figure 3:
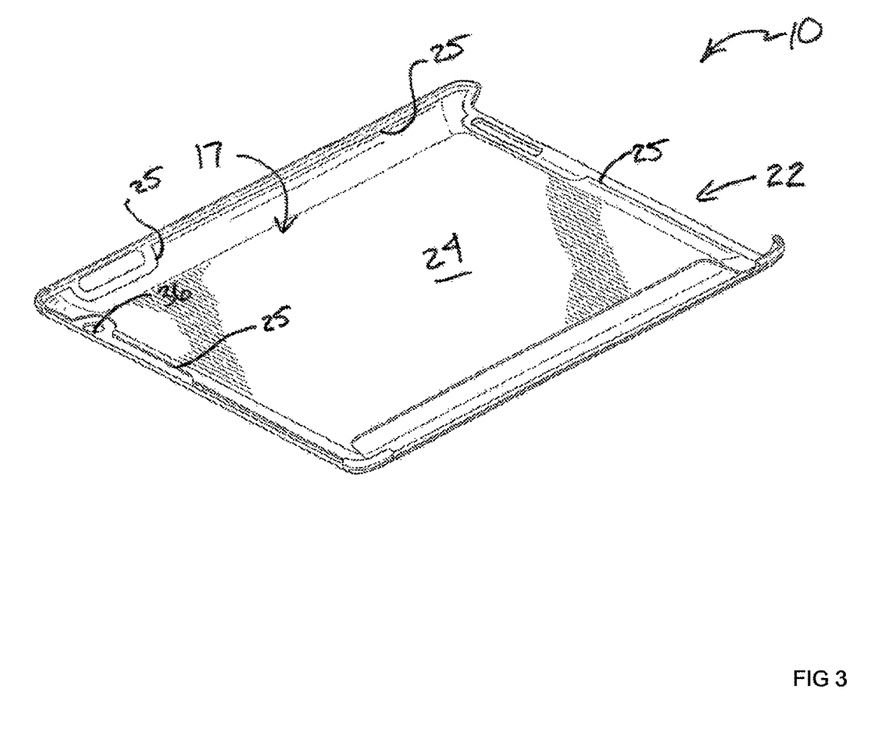
FIG. 3 is a perspective view of the inner surface of the protective case of FIG. 2.
Figure 4:
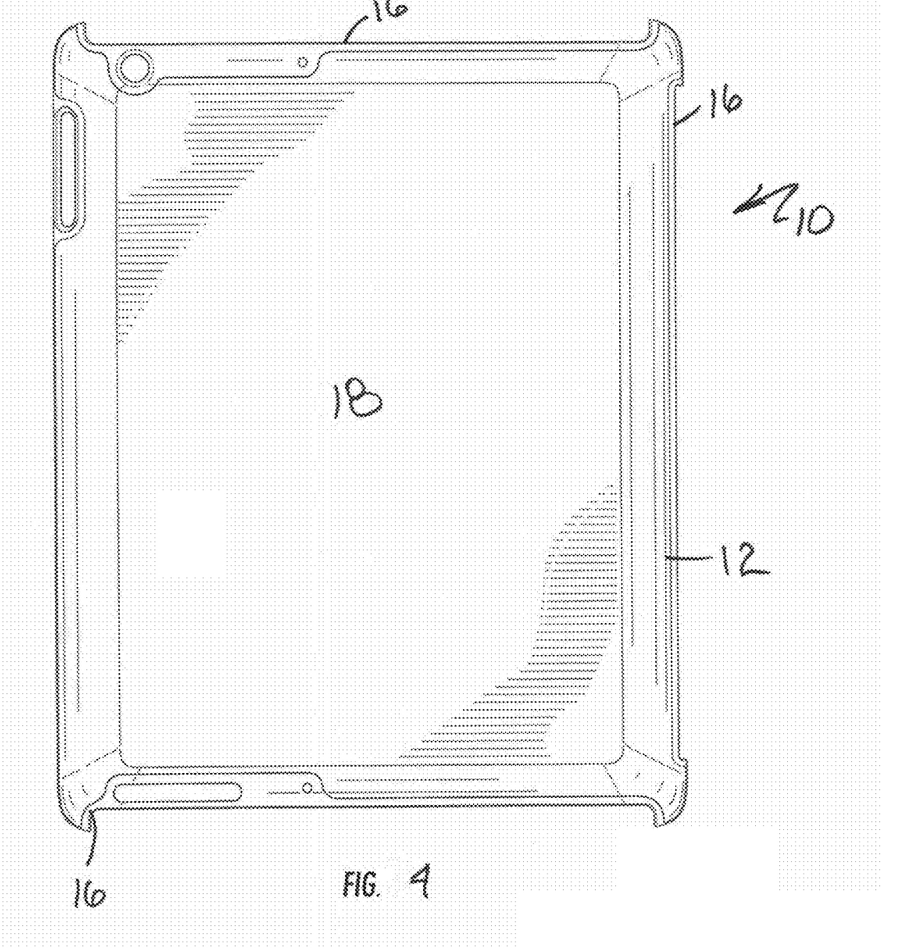
FIG. 4 is a back plan view of the protective case of FIG. 2.
Figure 5:
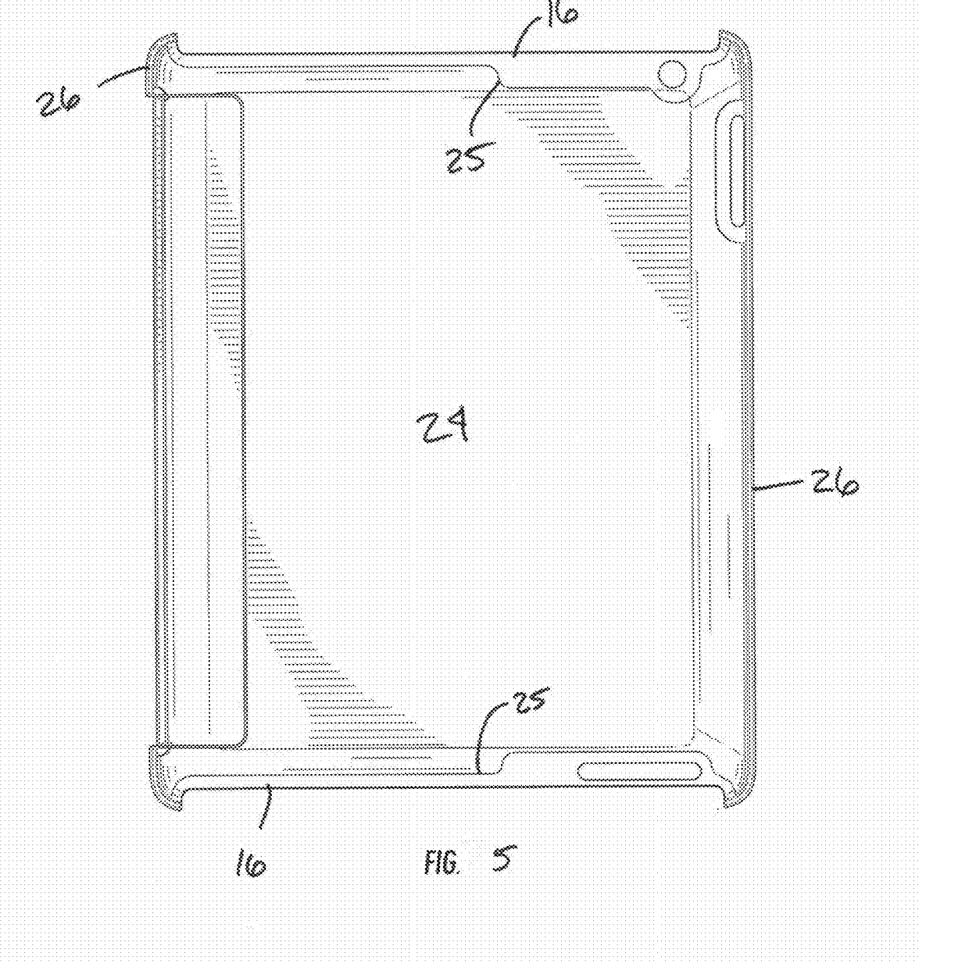
FIG. 5 is a front plan view of the protective case of FIG. 2.
Figure 6:
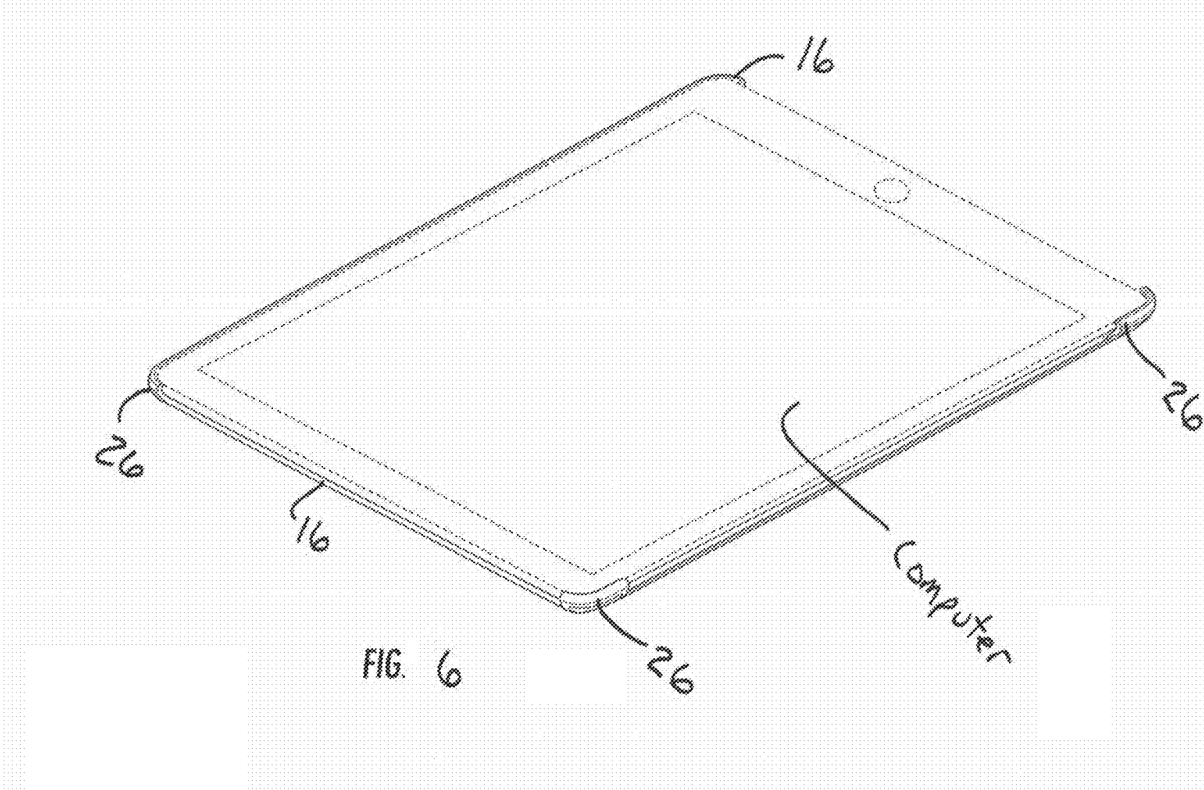
FIG. 6 is a perspective of the embodiment of FIG. 2 attached to a tablet computer.
Figure 7:
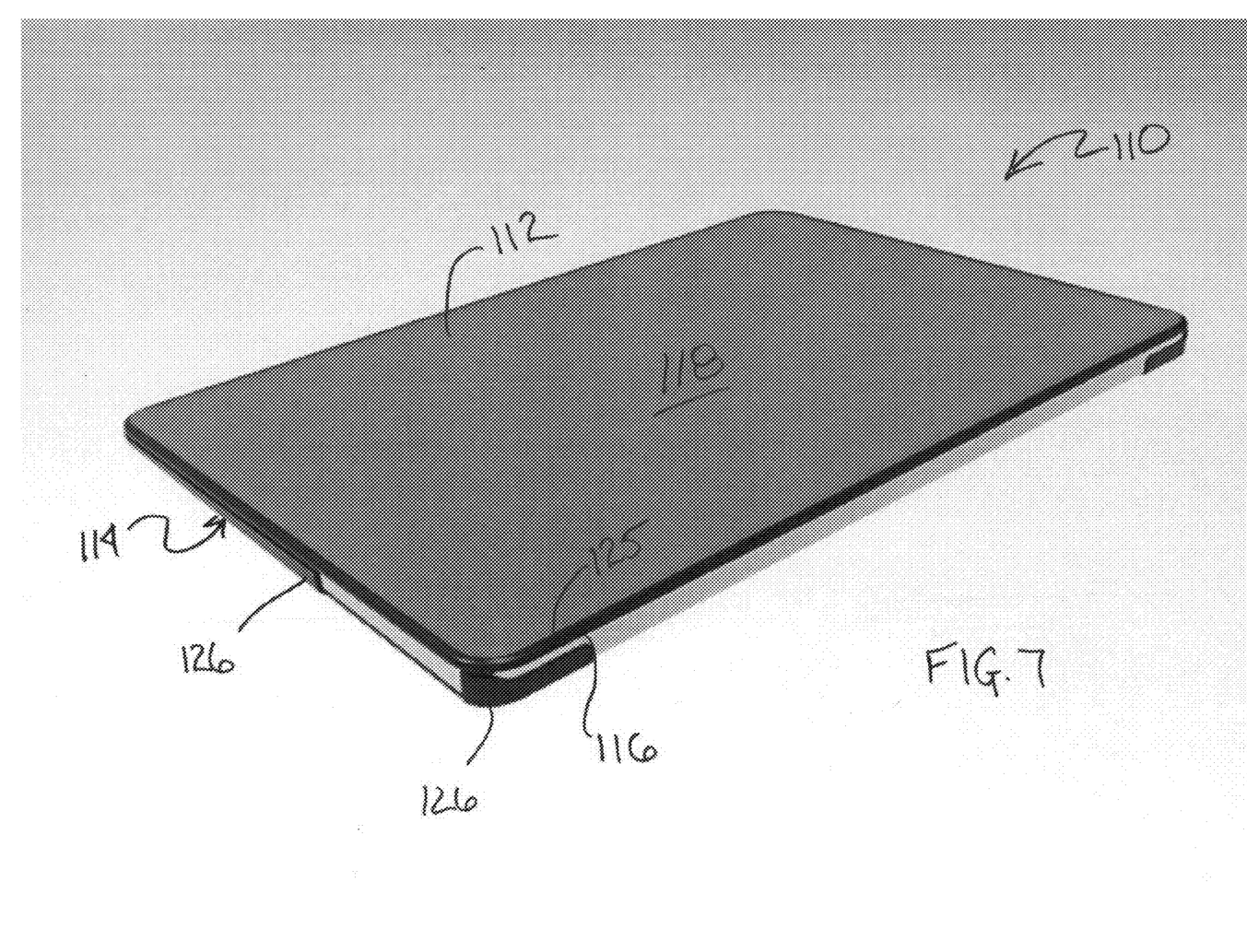
FIG. 7 is a perspective view of another embodiment of a two section protective case in accordance with the present invention.
Figure 8:
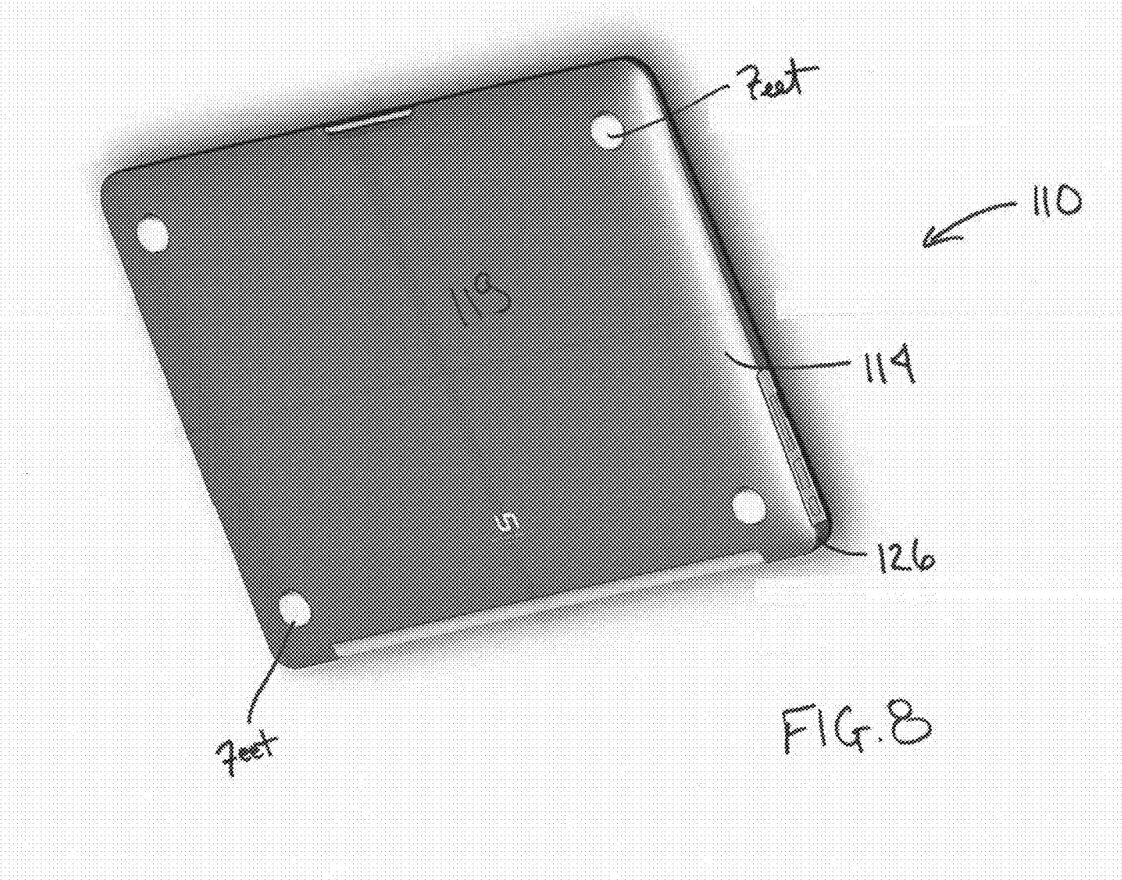
FIG. 8 is a bottom perspective view of the embodiment of FIG. 7.
Figure 9:
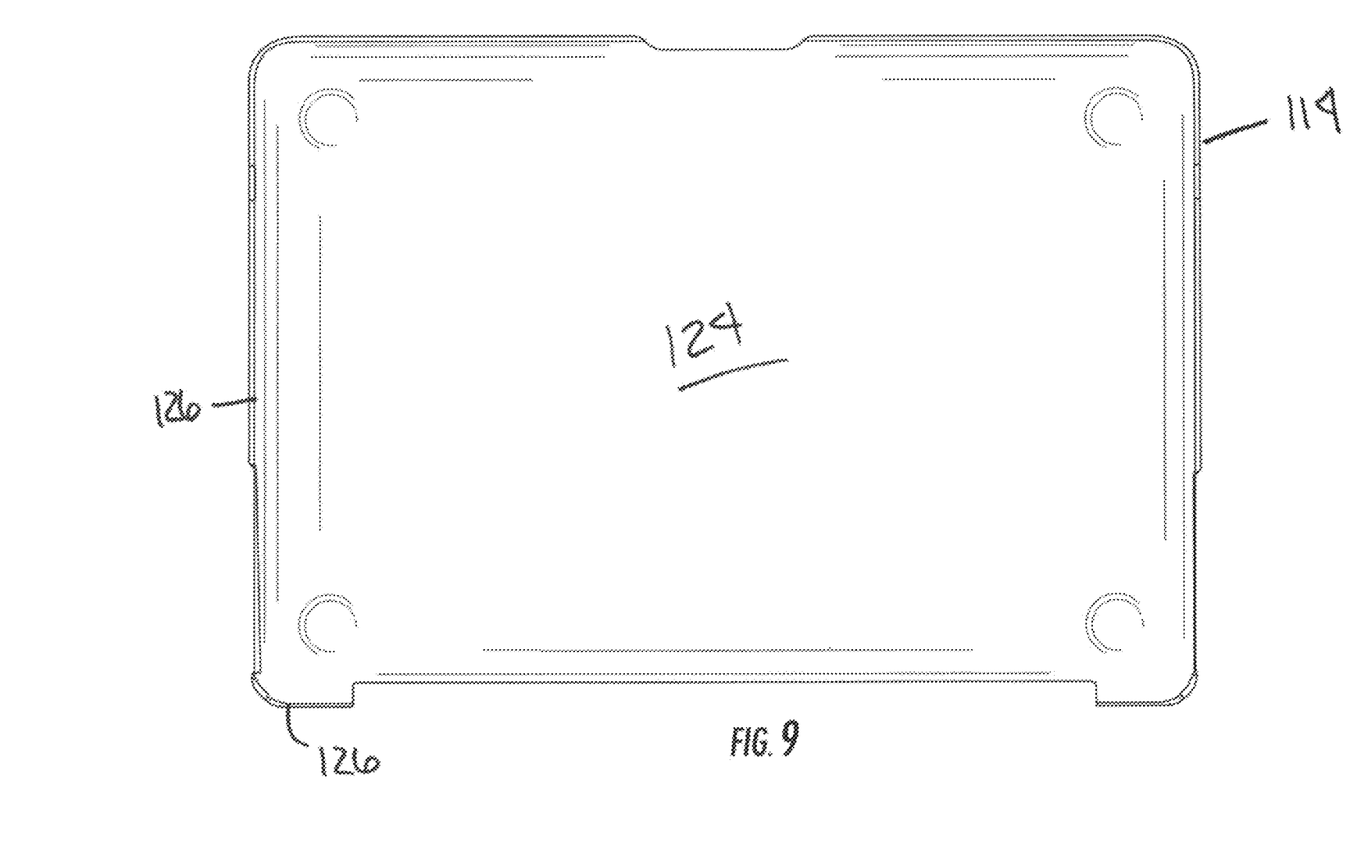
FIG. 9 is a top plan view of the second body section of the embodiment of FIG. 7.
Figure 10:
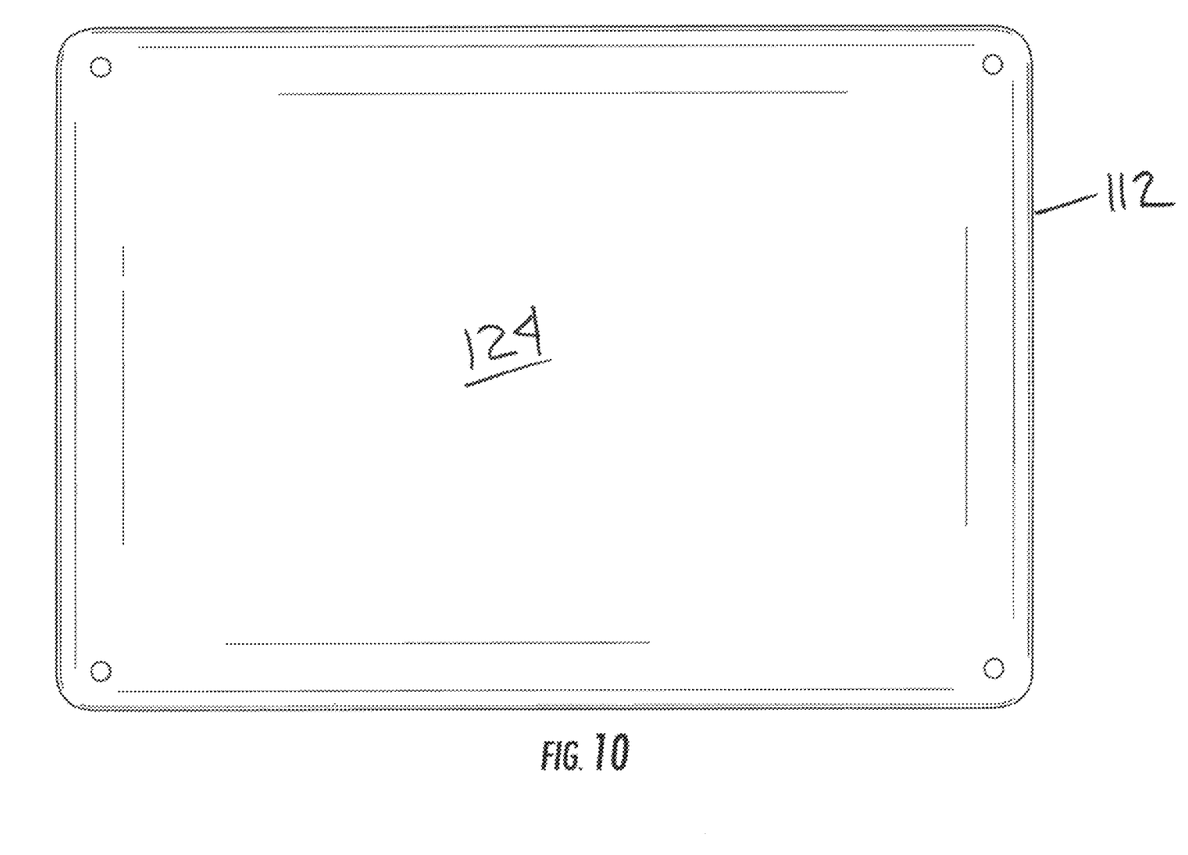
FIG. 10 is a bottom plan view of the first body section of the embodiment of FIG. 7.

Referring to FIGS. 1-3, another optional feature of the present case 10, conical passage 32, can be seen. The conical passage 32 is used to align with the electronic device's camera lens feature. As such, the conical passage 32 is preferably positioned on the back surface 18 of the case 10 in the body section 12. The passage 32 has an opening at each of the back surface 18 and the inner surface 24 of the case. A slanted sidewall 34 connects the two openings. Preferably, the inner surface opening 36 has a diameter less than the back surface opening 38. This configuration provides that a greater amount of light will be able to enter the camera aperture for better quality pictures. The conical sidewall 32 also prevents a photo "flash" effect prevalent in devices using tubular passages where indirect light reflects from the sidewall to "wash-out" a portion of the photo.

With reference to the specific embodiment of FIGS. 7-10, a protective carrying case 110 for a MacBook, manufactured and sold by Apple, Inc., or similar device is illustrated. The case 110 may be reconfigured and resized to fit any number of portable electronic computer devices, including notebooks, laptops, and the like. Those skilled in the relevant art will be able to understand and provide the required design changes to accommodate such alternate devices after a reading of the present detailed disclosure, including the appended drawing figures, without need for undue experimentation.

As shown, the protective case 110 includes a first body section 112 having a rim 116, and a second body section 114. Preferably, the three components are formed of high-strength thermoplastic polymers such as ABS and polycarbonate materials known in the art. The body section 112 has a back surface 118 which transforms along an edge 125 into rim 116. Likewise, the second body section has a back surface 119 which transforms into upturned sides 126. The edge 125 of both sections 112 and 114 is preferably radiused to provide a smooth transition from back surface 118 to rim 116 or sides 126. However, the edge 125 may be in the form of a traditional 45 degree corner, or some variation, as well. A cavity 122 is formed as defined by an inner surface 124 of the first body section 112, including the upturned sides 126, and the second body section 114.

The first and second body sections, 112 and 114, may also include integral button opening 28 for aligning with control switches on the encased electronic device (not shown), such as for volume and on/off buttons. These openings 128 are preferably positioned within the upturned side 26 of the body sections 112 and 114, but may also be on the back surface 118 for some applications.

The rim 116 is affixed to an edge of the upturned side 126 of the first body section 112. The rim 116 provides a slight overhang to the cavity 122 to facilitate securing an electronic device within the protective case 110. The rim 116 frames an open area where typically display functions are located.

As with the single body section of the embodiment above, the case 110 has a separately molded rim 116 which is tightly bonded to the first (i.e., top) body section 112. The use of the tightly bonded rim 116 accomplishes at least a few goals of this embodiment of the present invention. First, the rim 116 creates a perfect line about the open area 117. Second, the rim 116 is also able to mask many physical imperfections in the edge 125 as a result of an ink heat transfer (e.g., sublimation process). The rim 116 may also provide structural support to the case in many instances.

Therefore, it is preferably contemplated that the separately molded rim 116 be affixed to the first body section 112 and integrally bonded in either an injection molding or compression molding process. This subsequent bonding of the rim along an edge 125 of the upturned sides 126 of the first body section 112 ensures that any loosely transferred dye along this area of the body section 112 is masked by the rim 116.

It should be emphasized that the above-described embodiments of the present invention, particularly, any "preferred" embodiments, are possible examples of implementations merely set forth for a clear understanding of the principles for the invention. Many variations and modifications may be made to the above-described embodiment(s) of the invention without substantially departing from the spirit and principles of the invention. All such modifications are intended to be included herein within the scope of this disclosure and the present invention, and protected by the following claims.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A protective case for a portable electronic device, the case comprising:

a body section formed of a first material and having a back surface and upturned sides extending from the back surface, the back surface and upturned sides being configured to maintain contact with an outer surface of a portable electronic device positioned within a cavity defined by the back surface and upturned sides;

a distinct rim separately formed of a second material and attached to the body section; and a bond formed between the first material of the body section and the second material of the rim;

wherein at least a portion of the distinct rim forms an overhang to the cavity to maintain continuous contact with an outer surface of the electronic device and facilitate securing of the electronic device positioned within the cavity.

2. The protective case of claim 1, wherein the first material of the body section and the second material of the rim integrate to form the bond.

3. The protective case of claim 1, further comprising at least one opening positioned on an upturned side of the body section.

4. The protective case of claim 1, further comprising a second molded body section configured to conceal a surface of an electronic device secured within the case other than a surface already covered by the body section.

5. The protective case of claim 4, wherein the body section and the second molded body section have contrasting colors.

6. The protective case of claim 1, further comprising a passage having an opening on each of a back surface and an inner surface of the body section, the openings being connected by a sidewall.

7. The protective case of claim 6, wherein the passage opening on the back surface of the body section has a diameter greater than a diameter of the passage opening on the inner surface of the body section.

8. The protective case of claim 6, wherein the passage sidewall is sloped inward from the opening on the back surface to the opening on the inner surface.

9. A protective case for a portable electronic device, the case comprising:

a molded body section formed of a first material and having a back surface and upturned sides extending from the back surface, the back surface and upturned sides being configured to maintain contact with an outer surface of a portable electronic device positioned within a cavity defined by the back surface and upturned sides;

an image transferred onto at least a portion of the molded body section including the upturned sides;

a distinctly molded rim formed of a second material affixed to an edge of at least one of either the back surface and the upturned sides of the body section to mask imperfections at the edge caused by the image being transferred; and a bond formed between the first material of the body section and the second material of the rim;

wherein at least a portion of the rim forms an overhang at a periphery of the cavity to maintain continuous contact with an outer surface of the electronic device and facilitate securing of the electronic device positioned within the cavity.

10. The protective case of claim 9, wherein the first material of the body section and the second material of the rim integrate to form the bond.

11. The protective case of claim 9, further comprising at least one opening positioned on an upturned side of the body section.

12. The protective case of claim 9, further comprising a second molded body section configured to conceal a surface of an electronic device secured within the cavity other than a surface of the device already covered by the molded body section.

13. The protective case of claim 12, wherein the molded body section and the second molded body section have contrasting colors.

14. The protective case of claim 9, further comprising a passage having an opening on each of a back surface and an inner surface of the body section, the openings being connected by a sidewall.

15. The protective case of claim 14, wherein the passage opening on the back surface of the body section has a diameter greater than a diameter of the passage opening on the inner surface of the body section.

16. The protective case of claim 14, wherein the passage sidewall is sloped inward from the opening on the back surface to the opening on the inner surface.

17. The protective case of claim 9, further comprising a second molded body section of the first material having a back surface and upturned sides extending from the back surface, the back surface and upturned sides being configured to maintain contact with a portable electronic device positioned within the cavity of a first molded body section.

* * * * *